United States Patent
Kapoor et al.

(10) Patent No.: US 10,805,634 B2
(45) Date of Patent: Oct. 13, 2020

(54) SUPER-RESOLUTION PROCESSING METHOD FOR MOVING IMAGE AND IMAGE PROCESSING APPARATUS THEREFOR

(71) Applicant: Samsung Electronics Co., Ltd., Gyeonggi-do (KR)

(72) Inventors: Parichay Kapoor, Gyeonggi-do (KR); Ji-hun Oh, Gyeonggi-do (KR); Kwang-hoon Son, Gyeonggi-do (KR); Young-chul Cho, Gyeonggi-do (KR); Yong-sup Park, Seoul (KR); Hyun-jung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 13 days.

(21) Appl. No.: 15/982,382

(22) Filed: May 17, 2018

(65) Prior Publication Data
US 2018/0338159 A1    Nov. 22, 2018

(30) Foreign Application Priority Data

May 17, 2017    (KR) .................... 10-2017-0061195
Feb. 1, 2018    (KR) .................... 10-2018-0012941

(51) Int. Cl.
*H04N 5/232*    (2006.01)
*H04N 21/234*    (2011.01)
(Continued)

(52) U.S. Cl.
CPC .............. *H04N 19/59* (2014.11); *G06N 3/02* (2013.01); *G06N 3/0445* (2013.01);
(Continued)

(58) Field of Classification Search
CPC ..... H04N 5/3575; H04N 5/378; G11C 27/026
See application file for complete search history.

(56) References Cited

U.S. PATENT DOCUMENTS

| 4,995,088 A | 2/1991 | Farhat |
| 9,020,302 B2 | 4/2015 | Shmunk |

(Continued)

FOREIGN PATENT DOCUMENTS

| CN | 104778659 | 7/2015 |
| CN | 104992410 | 10/2015 |

(Continued)

OTHER PUBLICATIONS

Christian Ledig, et al.; "Photo-Realistic Single Image Super-Resolution Using a Generative Adversarial Network", arXiv: 1609.04802v5 [cs.CV], May 25, 2017.

(Continued)

*Primary Examiner* — Hung H Lam
(74) *Attorney, Agent, or Firm* — The Farrell Law Firm, P.C.

(57) ABSTRACT

A super-resolution processing method of a moving image is provided. The super-resolution processing method of a moving image includes sequentially inputting a plurality of input frames included in the video to any one of a recurrent neural network (RNN) for super-resolution processing and a convolutional neural network (CNN) for super-resolution processing, sequentially inputting a frame sequentially output from the any one of the RNN and the CNN to an additional one of the RNN and the CNN, and upscaling a resolution of the output frame by carrying out deconvolution with respect to a frame sequentially output from the additional one of the RNN and the CNN.

19 Claims, 11 Drawing Sheets

(51) Int. Cl.

| | | |
|---|---|---|
| *H04N 19/59* | (2014.01) | |
| *G06N 3/02* | (2006.01) | |
| *G06N 3/04* | (2006.01) | |
| *H04N 21/44* | (2011.01) | |
| *H04N 21/4402* | (2011.01) | |
| *H04N 9/04* | (2006.01) | |
| *H04N 21/2343* | (2011.01) | |

(52) U.S. Cl.
CPC ....... *G06N 3/0454* (2013.01); *H04N 5/23232* (2013.01); *H04N 5/23254* (2013.01); *H04N 9/045* (2013.01); *H04N 21/23418* (2013.01); *H04N 21/234363* (2013.01); *H04N 21/44008* (2013.01); *H04N 21/440263* (2013.01); *G06N 3/0481* (2013.01)

(56) References Cited

U.S. PATENT DOCUMENTS

| | | | |
|---|---|---|---|
| 9,665,927 | B2 | 5/2017 | Ji et al. |
| 2013/0156345 | A1 | 6/2013 | Shmunk |
| 2016/0247064 | A1* | 8/2016 | Yoo ........................ G06N 3/082 |
| 2016/0358314 | A1 | 12/2016 | Ji et al. |
| 2017/0083772 | A1 | 3/2017 | Kim et al. |
| 2017/0200076 | A1* | 7/2017 | Vinyals ................ G06N 3/0445 |
| 2017/0323223 | A1 | 11/2017 | Nagata et al. |
| 2018/0083898 | A1* | 3/2018 | Pham .................... H04L 51/046 |
| 2018/0139458 | A1* | 5/2018 | Wang ..................... H04N 19/33 |
| 2018/0174576 | A1* | 6/2018 | Soltau ..................... G10L 15/16 |
| 2018/0268298 | A1* | 9/2018 | Johansen ............. G06K 9/6262 |
| 2018/0337994 | A1* | 11/2018 | Dachille ............... G06F 16/583 |

FOREIGN PATENT DOCUMENTS

| | | |
|---|---|---|
| CN | 105976318 | 9/2016 |
| CN | 106204447 | 12/2016 |
| CN | 106204489 | 12/2016 |
| CN | 106228512 | 12/2016 |
| KR | 10-2017-0034226 | 3/2017 |
| WO | WO 2012/018282 | 2/2012 |
| WO | WO 2016/076026 | 5/2016 |
| WO | WO 2016/132147 | 8/2016 |
| WO | WO 2016/132152 | 8/2016 |

OTHER PUBLICATIONS

Armin Kappeler, et al.; "Video Super-Resolution With Convolutional Neural Networks", IEEE Transactions on Computational Imaging, vol. 2, No. 2, Jun. 2016, pp. 109-121.

Jiwon Kim, et al.; "Accurate Image Super-Resolution Using Very Deep Convolutional Networks", arXiv: 1511.04587v2 [cs.CV], Nov. 11. 2016, pp. 1-9.

Chao Dong et al., "Image Super-Resolution Using Deep Convolutional Networks", IEEE Transactions on Pattern Analysis and Machine Intelligence, Jul. 31, 2015, 14 pages.

International Search Report dated Sep. 12, 2018 issued in counterpart application No. PCT/KR2018/005633, 11 pages.

Jeroen Manders: Radboud University Nijmegen, "Optimizing Convolutional Neural Networks for Fast Training on a Small Dataset", XP055618108, May 11, 2016, 27 pages.

Lorenzo Baraldi et al., "Hierarchical Boundary-Aware Neural Encoder for Video Captioning", XP081399245, Apr. 10, 2017, 10 pages.

Markos Markou et al., "Novelty Detection: A Review—Part 2: Neural Network Based Approaches", Signal Processing, vol. 83, Dec. 1, 2003, 23 pages.

Chao Dong et al., "Image Super-Resolution Using Deep Convolutional Networks", IEEE Transactions on Pattern Analysis and Machine Intelligence, Feb. 1, 2016, 13 pages.

European Search Report dated Sep. 13, 2019 issued in counterpart application No. 18801442.7-1209, 14 pages.

Yan Huang et al., "Bidirectional Recurrent Convolutional Networks for Multi-Frame Super-Resolution", Center for Research on Intelligent Perception and Computing, 2015, pp. 1-9.

Jose Caballero, et al., "Real-Time Video Super-Resolution with Spatio-Temporal Networks and Motion Compensation", IEEE Xplore, 2016, pp. 4778-4787.

European Examination Report dated Jun. 10, 2020 issued in counterpart application No. 18801442.7-1209, 9 pages.

\* cited by examiner

SUPER-RESOLUTION PROCESSING METHOD FOR MOVING IMAGE AND IMAGE PROCESSING APPARATUS THEREFOR

CROSS-REFERENCE TO RELATED APPLICATION

This application is based on and claims priority under 35 U.S.C. § 119 to Korean Patent Application No. 10-2017-0061195 and Korean Patent Application No. 10-2018-0012941, filed on May 17, 2017 and Feb. 1, 2018, respectively, in the Korean Intellectual Property Office, the disclosures of which are incorporated herein by reference in their entirety.

BACKGROUND

1. Field

The present disclosure relates to a super-resolution processing method of a moving image and an image processing apparatus therefor, and more particularly, to a super-resolution processing method which is capable of upscaling a moving image to super-resolution and an image processing apparatus therefor.

2. Description of Related Art

In recent years, a convolutional neural network (CNN), which is a type of the deep learning technology, is used for super-resolution processing of an image. The super-resolution processing typically includes the steps of, in response to receiving an image of a low resolution in a CNN, acquiring feature data for each patch of the image, and upscaling the received image of the low resolution to an image of a super-resolution by using the acquired feature data and previously learned data.

Accordingly, by the super-resolution processing method on the basis of the CNN, the user can obtain an image of a super-resolution which is smooth and sharp compared with the case where a size of a low-resolution image is simply enlarged. The CNN for super-resolution processing is also commonly called a super-resolution CNN (SRCNN).

However, if the same super-resolution processing is used in a moving image, super-resolution frames can be obtained with respect to each of a plurality of frames included in the moving image; however, the super-resolution processing is performed with respect to each of the plurality of frames independently of each other and thus, a flickering phenomenon or a phenomenon in which a discontinuity artifact among the plurality of frames may occur.

Accordingly, there is a need for an improvement measure for resolving a flickering phenomenon of a moving image for which super-resolution processing is made based on the CNN or a phenomenon in which a discontinuity artifact occurs.

SUMMARY

Embodiments of the present disclosure are to address at least the above-mentioned problems and/or disadvantages and to provide at least the advantages described below.

According to an aspect of the disclosure, a super-resolution processing method is provided which is capable of obtaining a moving image for which a super-resolution processing is continuously made without flickering phenomenon and an image processing apparatus therefor.

In accordance with an embodiment, a super-resolution processing method of a moving image is provided, the method including sequentially inputting a plurality of frames included in the moving image to a recurrent neural network (RNN) for super-resolution processing or a CNN for super-resolution processing; in response to a plurality of frames being sequentially output from the RNN or the CNN sequentially inputting the plurality of frames to the CNN or the RNN, respectively; and upscaling a resolution of a plurality of frames output from the CNN or the RNN by performing deconvolution with respect to the plurality of frames output from the CNN or the RNN.

In accordance with another embodiment, an image processing apparatus is provided which carries out super-resolution processing of a moving image, the image processing apparatus including an inputter configured to receive input of the moving image; and a processor configured to sequentially input a plurality of frames included in the moving image to an RNN for super-resolution processing and a CNN for super-resolution processing, in response to a plurality of frames being sequentially output from the RNN or the CNN, sequentially input the plurality of frames to the CNN or the RNN, respectively, and to upscale a resolution of a plurality of frames output from the CNN or the RNN by performing deconvolution for the plurality of frames sequentially output from the CNN or the RNN.

In accordance with another embodiment, a recording medium stores a program for executing a super-resolution processing method of a moving image that includes sequentially inputting a plurality of frames included in the moving image to a RNN for super-resolution processing or a CNN for super-resolution processing; in response to a plurality of frames being sequentially output from the RNN or the CNN, sequentially inputting the plurality of frames to the CNN or the RNN, respectively; and upscaling a resolution of a plurality of frames by performing deconvolution for the plurality of frames sequentially output from the CNN or the RNN.

BRIEF DESCRIPTION OF THE DRAWINGS

The above and other aspects, features and advantages of certain embodiments will be more apparent from the following description taken in conjunction with the accompanying drawings, in which.

DETAILED DESCRIPTION

Figure 1:
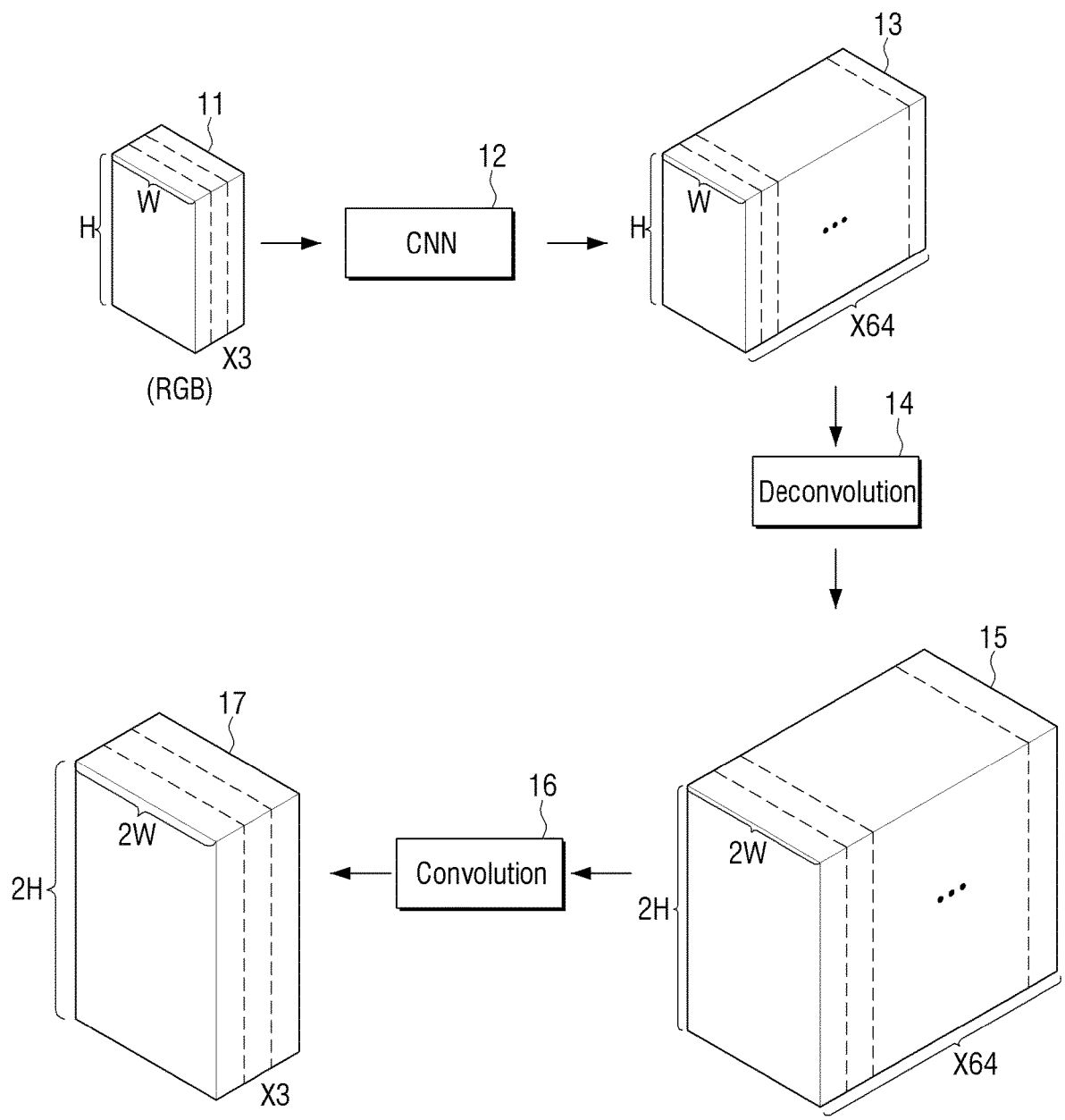
FIG. 1 is a diagram illustrating a method which performs a super-resolution processing process through a CNN, according to an embodiment.

Embodiments of the present disclosure are described with reference to the accompanying drawings.

Terms used in the present disclosure are general terms selected based on the functions of the various embodiments. These terms may vary depending on intention, legal or technical interpretation, and emergence of new technologies. Further, some of the terms may be arbitrarily selected by the applicant. Unless there is a specific definition of a term, the term may be construed based on the general knowledge and technological common sense of those skilled in the related art.

Similar reference numerals may be used to indicate similar components that perform substantially the same functions throughout the specification. For the sake of explanation and understanding, different embodiments are described with reference to similar reference numerals. That is, even if all the components in the plurality of drawings have similar reference numerals, it does not mean that the plurality of drawings refer to only one embodiment.

Further, terms including numerical expressions, such as a "first" and a "second", may use corresponding components regardless of importance or order and are used to distinguish a component from another without limiting the components. These terms are used only for the purpose of differentiating one component from another, without limitation thereto. For example, a first component may be referred to as a second component and vice versa without departing from the scope of the present disclosure. That is, respective ordinal numbers are interchangeably used, if necessary.

A singular form may include one or more things, unless context clearly dictates otherwise. In this disclosure, the terms "include", "have", and "has" may be used to designate characteristics, numbers, operations, elements, components or a combination thereof, and not to exclude the existence or possibility of adding one or more of other characteristics, numbers, operations, elements, components or a combination thereof.

The terms "module", "unit", and "part", are used to indicate components that perform at least one function and operation, implemented in hardware, software, or firmware, and may be interchangeably used with other terms, such as, "logic," "logic block," "part," or "circuitry". Further, except for when each of a plurality of "modules", "units", and "parts", needs to be realized in individual hardware, the components may be implemented in a form of an application-specific integrated circuit (ASIC).

When a first portion being connected to a second portion is described, the first portion may be either connected directly to the second portion, or connected indirectly via another medium. Further, when a portion includes another component, it does not exclude the possibility of including additional components, that is, the portion may further include other components besides the described component.

FIG. 1 is a diagram illustrating a method which performs a super-resolution processing through a CNN, according to an embodiment.

A plurality of frames included in a moving image may be continuously input to a CNN 12. A color format of the plurality of frames may be a format of three channels, including red green blue (RGB) and luminance chroma blue chroma red (YcbCr) formats. An example in which a plurality of frames included in a moving image is implemented in a format of three channels of RGB format will be described below, unless otherwise specified.

In this regard, as illustrated in FIG. 1, a plurality of frames including a frame 11 included in a moving image may be sequentially input to the CNN 12, and the frame 11 input to the CNN 12 may be an image patch in which an original frame of a moving image is divided into a width (W) and a length (H). For convenience of explanation, it will be assumed that a divided image patch which is input to the CNN 12 is uniformly called a frame.

Meanwhile, a frame 11 which is input to the CNN 12 may have a depth corresponding to the three RGB channels. In this regard, the CNN 12 is a neural network for which super-resolution processing of an image is learned. The CNN 12 may generate a feature map by applying a plurality of pre-learned filters to each frame 11, and repeat a process of applying an activation function to the generated feature map a predetermined number of times. In this regard, the activation function may include a sigmoid function, a tanh function, and a rectifier linear unit (ReLU).

For example, if 64 filters having three channels are respectively applied to the frame 11 input to the CNN 12 and an ReLU function is applied, a feature map 13 having the same size as the input frame 11 and having 64 channels may be output. In this regard, the feature map 13 which is output may include new pixel information through 64 channels, and the new pixel information is information used for the super-resolution processing.

When a deconvolutional calculation 14, which is opposite to the convolutional calculation in the CNN 12, is performed with respect to the output feature map 13, a super-resolution feature map 15 of 64 channels, having a size of an integer multiple of the feature map 15, is generated based on the new pixel information included in the output feature map 13. The convolutional calculation 16 may be performed with respect to the generated super-resolution feature map 15 again to ultimately obtain a super-resolution frame 17 of three channels.

As illustrated in FIG. 1, a super-resolution frame 17 of three channels may have a resolution (2 W×2 H) of twice as much as a resolution of the frame 11 input to the CNN 12.

However, the super-resolution processing as described above is performed for each frame of a moving image independently of each other, and a flickering and a discontinuity artifact may occur.

To resolve the a flickering and a discontinuity artifact, a method of simultaneously inputting consecutive frames to a CNN input terminal or a bidirectional recurrent convolutional network is proposed. The recurrent convolutional network is implemented to preserve information on a hidden layer when the previous frame is processed, and to reflect it in the next frame, thereby increasing a visual-temporal dependency of an image or video.

However, a method of simultaneously inputting previous consecutive frames may exponentially increase the calculation of the number of input frames by NA2 (N being the number of input frames), and discontinuity may still occur periodically.

Additionally, in the recurrent convolutional network, all convolution layers have a clusterably connected shape, such as a recurrent convolution and a conditional convolution, and thus, a processing capacity of six times more than that of the previous method is demanded.

Accordingly, an algorithm generated by serially connecting a recurrent neural network (RNN) to the CNN is provided. The algorithm is a neural network structure that demands a minimum calculation (i.e., processing) amount and is capable of efficiently reflecting a visual-temporal dependency when processing consecutive frames of a moving image.

FIGS. 2 to 6 are diagrams illustrating a super-resolution processing process in which the CNN and the RNN are combined, according to various embodiments.

The RNN is a deep learning technology for processing data in which chronological correlation is important, such as time series data including conversation data and moving image speech data. In general, the RNN predicts a current state through a previous state and an input value. In this regard, the previous state is recurrent in the hidden layer and reflected in the current state and thus, the previous calculation result affects the next calculation.

The RNN may be combined with the CNN in various ways. For example, a plurality of input frames included in a moving image may be sequentially input to any one of an RNN and a CNN. Thereafter, a frame sequentially output from the RNN and the CNN may be sequentially input to another one from among the RNN and the CNN. In other words, the plurality of frames included in the moving image may be sequentially input to the RNN or the CNN and a plurality of frames being sequentially output from the RNN or the CNN may be sequentially input to the CNN or the RNN, respectively.

Figure 2:
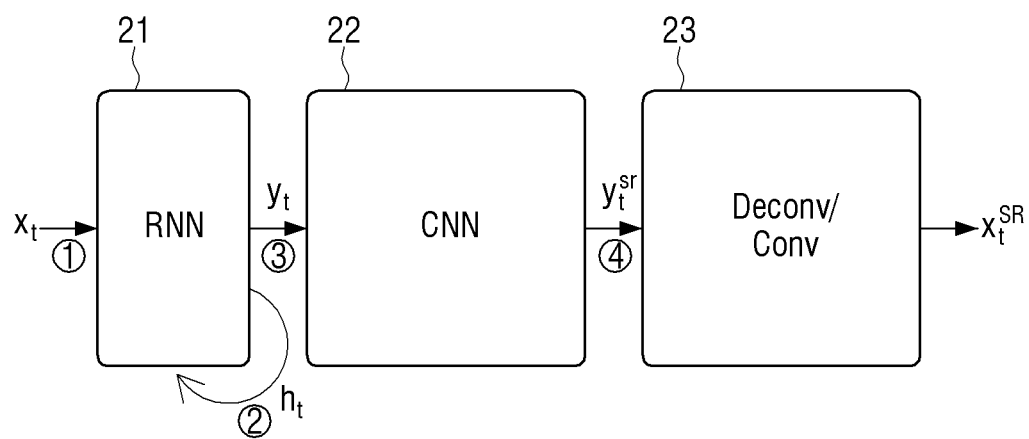
FIGS. 2 to 5 are diagrams illustrating a super-resolution processing process in which the CNN and the RNN are combined, according to various embodiments.

FIG. 2 illustrates a structure in which a plurality of frames of a moving image are sequentially input to the RNN 21, and frames output from the RNN are sequentially input to the CNN 22. The RNN 21 has a structure in which a current (t) frame $(x_t)$ is input to the RNN 21 and information $(h_t)$ on a hidden state of the current frame is recurrent to a hidden layer of the next frame.

The information $h_t$ on the hidden state of the current frame is updated by information $h_{t-1}$ on a hidden state of the previous frame, and an output $(y_t)$ of a hidden layer of the current frame receives the $h_t$ and is updated. The information $h_t$ on the hidden state of the current frame may be expressed as Formula (1) as shown below.

$$h_t = \sigma_h(W_h * x_t + U_h * h_{t-1} + b_h) \quad \text{[Mathematical Formula (1)]}$$

In Mathematical Formula (1), $W_h$ is a weight value for convoluting the input $x_t$ of the RNN 21 (weight value of connecting wire ①), $U_h$ is a weight value for convoluting the information $h_{t-1}$ on a hidden state of the previous frame (weight value of connecting wire ②), and $b_h$ is a bias of the connecting wire ①. $\sigma_h$ refers to an activation function of a hidden layer, and a non-linear function is used as the activation function. For example, $\sigma_h$ may be tanh which is a representative non-linear function.

Meanwhile, the output $y_t$ of the RNN 21 may be expressed as Formula (2) as shown below.

$$y_t = \sigma_y(W_y * h_t + b_y) \quad \text{[Mathematical Formula (2)]}$$

In Mathematical Formula (2), $W_y$ is a weight value for which convolution is made with the information $h_t$ on the hidden state of the current frame (weight value of the connecting wire ③), and $b_y$ is a bias of the connecting wire ③. $\sigma_y$ is an activation function of an output terminal of the RNN 21.

Accordingly, a plurality of frames input to the CNN 22 may respectively include information on a hidden state of the previous frame, and thus super-resolution processing in which a continuity of the plurality of frames is reflected may be carried out for the CNN 22.

A plurality of frames sequentially input to the CNN 22 are low-resolution frames for which a resolution has not been converted. A plurality of feature maps output from the CNN 22 are feature maps including information on a frame of a relatively super-resolution process compared with the corresponding frame input to the CNN 22 (i.e. information which is capable of being converted to a super-resolution frame). In this regard, a plurality of feature maps output from the CNN 22 will be expressed as $y_t^{sr}$ to be distinguished from a plurality of frames $y_t$.

For the output feature map $y_t^{sr}$ of the CNN 22, deconvolution and convolution are respectively carried out, and a plurality of frames $x_t^{SR}$ which are scaled up to a super-resolution are generated. The plurality of frames $x_t^{SR}$ are sequentially combined so that a moving image which is scaled up to a super-resolution is ultimately output.

Meanwhile, as illustrated in FIG. 2, a neural network structure having a shape in which the order of RNN 21 and CNN 22 are changed may be implemented as well. The feature map $x_t^{SR}$ of the current frame output from the CNN 22 is input to the RNN 21, and the information $h_t$ on the hidden state of the current frame is recurrent to the hidden layer of the next frame, and a plurality of feature maps $y_t^{sr}$ with the information on the previous frame may be sequentially output.

Figure 3:
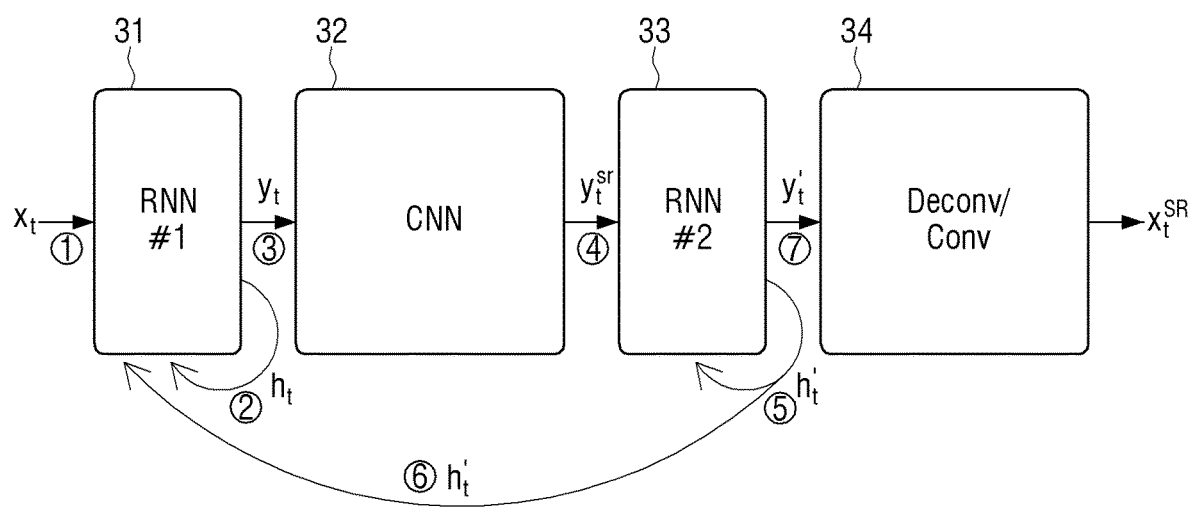

FIG. 3 is illustrates a structure in which a plurality of frames of a moving image are sequentially input to a first RNN 31, feature maps output from the first RNN 31 are sequentially input to the CNN 32, and feature maps output from the CNN 32 are sequentially input to a second RNN 33.

In the first RNN 31, a current frame $x_t$ is input, and information $h_t$ on a hidden state of the current frame is recurrent to a hidden layer of the next frame. The information $h_t$ on the current hidden state is updated by the information $h_{t-1}$ on the hidden state of the previous frame, and $y_t$ is output as the first RNN 31.

In addition, when $y_t$ output from the first RNN 31 is input to the CNN 32, a feature map $y_t^{sr}$, including information capable of being converted to a super-resolution frame is output, and the output $y_t^{sr}$ is input to the second RNN 32.

The second RNN 33, like the first RNN 32, has a structure in which the information h'$_t$ on the hidden state of the feature map $y_t^{sr}$ of the current frame is recurrent to the hidden layer of the next frame. FIG. 3 illustrates when the information h'$_t$ on the hidden state of the current frame is recurrent to the hidden layer of the next frame through the connecting wire ⑤.

In this regard, the second RNN 33 may, as illustrated in FIG. 3, recur h'$_t$ to a hidden layer of the current frame $x_t$ of the first RNN 31 (connecting wire ⑥).

In other words, in the first RNN 31, $h_t$ is updated by the information h'$_{t-1}$ on the hidden state of the previous frame which includes, before the CNN 32 is input, information h'$_{t-1}$ on the hidden state of the previous frame having a relatively low resolution, and after the CNN 32 is input, information capable of being converted to a super-resolution frame. An output $y_t$ of the first RNN 31 is then output according to the updated $h_t$.

Accordingly, in the first RNN 31, the information $h_t$ on the hidden state of the current frame may be expressed as Formula (3) as shown below.

$$h_t = \sigma_h(W_h * x_t + U_h * h_{t-1} + V_h * h'_{t-1} + b_h) \quad \text{[Mathematical Formula (3)]}$$

In Mathematical Formula (3), a weight value $V_h$, which is convoluted with the information h'$_{t-1}$ on the hidden state of the previous frame of the second RNN 33, refers to a weight value of the connecting wire ⑥, which is recurrent from the second RNN 33 to the first RNN 31. The remaining variables are defined in Mathematical Formula 1, above.

The $h_t$ includes both the information $h_{t-1}$ on the hidden state of the previous frame having a relatively low resolution and the $h'_{t-1}$ on the hidden state of the previous frame including information that may be converted to a frame having a super-resolution. Thus, super-resolution processing in which the information on the previous frame is improved by the CNN 32 process is possible.

Meanwhile, the $h'_t$, which is recurrent from the second RNN may be expressed as Formula (4) as shown below.

$$h'_t = \sigma_h(W'_h * y_t^{sr} + U'_h * h'_{t-1} + b'_h) \quad \text{[Mathematical formula (4)]}$$

In Mathematical Formula (4), $W'_h$ refers to a weight value of the connecting wire ④ which is input to the second RNN 33. $U'_h$ refers to a weight value of the connected connecting wire ⑤ which is recurrent from the second RNN to the hidden layer of the previous frame. The $b'_h$ is a bias of the connecting wire ④ which is input to the second RNN 33.

The output $y'_t$ of the second RNN 33 may be expressed as Formula (5) as shown below.

$$y'_t = \sigma_y(W'_y * h'_t + b'_y) \quad \text{[Mathematical Formula (5)]}$$

In Mathematical Formula (5), $W'_y$ and $b'_y$ respectively refer to a weight value of the connecting wire ⑦ via which the $y'_t$ is output from the second RNN 33 and a bias of the connecting wire ⑦ via which the $y'_t$ is output from the second RNN 33.

For the $y'_t$ output from the second RNN 33, as in FIG. 2, the deconvolution and the convolution are respectively carried out. Thus, a plurality of frames $x_t^{SR}$ scaled up to a super-resolution are generated. A plurality of frames $x_t^{SR}$ are sequentially combined so that a moving image which is scaled up to a super-resolution is ultimately output.

According to FIG. 3, the CNN 32 may receive information on a previous frame having a low resolution from an RNN 31 positioned at a front end of the CNN 32, and may receive information on a previous frame that can be converted to a super-resolution frame from an RNN 33 positioned at a rear end of the CNN 32. The CNN 32 may reflect the received information in extracting information for the current frame to be converted to a super-resolution frame.

Figure 4:
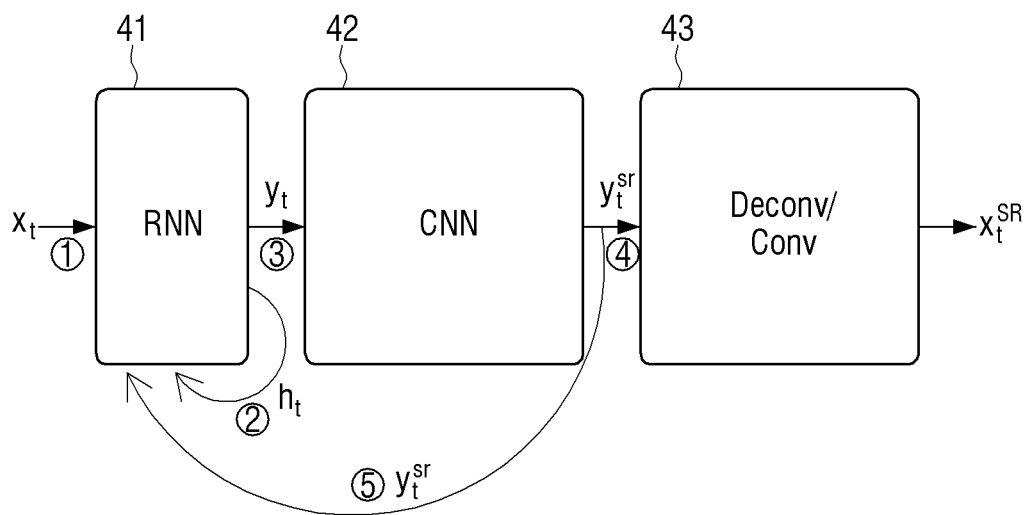

FIG. 4 illustrates a structure in which a plurality of frames of a moving image are sequentially input to an RNN 41, frames output from the RNN 41 are sequentially input to the CNN 42, and feature maps output from the CNN 42 are sequentially recurrent to the RNN 41 again.

In the RNN 41, a current frame $x_t$ is input, and information $h_{t-1}$ on a hidden state of the current frame is recurrent to a hidden layer of the next frame. The information $h_t$ on the hidden state of the current frame is updated by the information $h_{t-1}$ on the hidden state of the previous frame, and $y_t$ is output from the RNN 41.

In addition, when $y_t$ is input to the CNN 42, a feature map $y_t^{sr}$ including information capable of being converted to a super-resolution frame is output. In this regard, the $y_t^{sr}$ is recurrent to the RNN 41.

FIG. 4 illustrates a case in which the output $y_{t-1}^{sr}$ of the previous frame is recurrent to the hidden layer of the current frame of the RNN 41 via the connecting wire ⑤.

In this regard, in the RNN 41, the information $h_t$ on the hidden state of the current frame may be expressed as Formula (6) as shown below.

$$h_t = \sigma_h(W_h * x_t + U_h * h_{t-1} + V_h * y_{t-1}^{sr} + b_h) \quad \text{[Mathematical Formula (6)]}$$

In Mathematical Formula (6), $V_h$ refers to a weight value of the connecting wire ⑤ which is recurrent to the RNN 41. The remaining variables are defined in Mathematical Formula (3), above.

Meanwhile, as a modification of the structure illustrated in FIG. 4, to increase the efficiency of calculation (i.e. processing), a structure in which $h_t$ is not recurrent in the RNN 41 is possible as well. That is, the connecting wire ② may be omitted and the information $h_t$ on the hidden state of the current frame in the RNN 41 may be expressed as Formula (7) as shown below.

$$h_t = \sigma_h(W_h * x_t + U_h * y_{t-1}^{sr} + b_h) \quad \text{[Mathematical Formula (7)]}$$

In Mathematical Formula (7), $U_h$ refers to a weight value of the connecting wire ⑤ which is recurrent to the RNN 41. The remaining variables are defined in Mathematical Formula (6), above.

For the output feature map $y_t^{sr}$ of the CNN 42, the deconvolution and the convolution are respectively carried out sequentially and thus, a plurality of frames $x_t^{SR}$ scaled up to a super-resolution are generated. The plurality of frames $x_t^{SR}$ are sequentially combined so that a moving image scaled up to a super-resolution is ultimately output.

Figure 5:
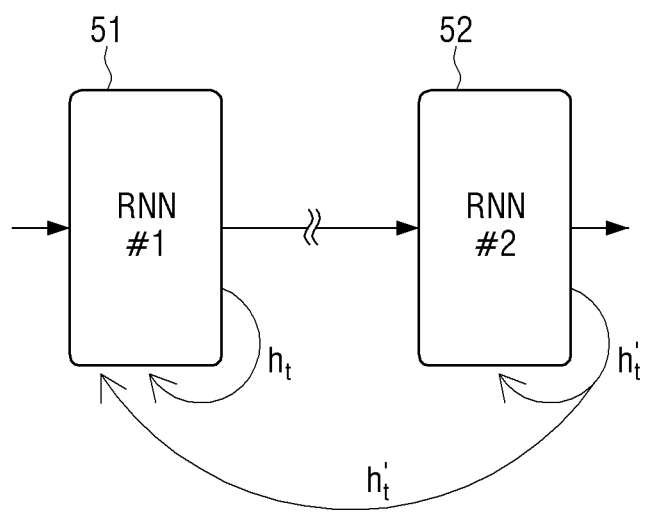

FIG. 5 illustrates a structure in which a plurality of RNNs are connected in series, according to an embodiment. A first RNN 51 and a second RNN 52 are connected in series. The first RNN 51 and the second RNN 52 may respectively recur information $h_t$ on a hidden state of a current frame to a hidden layer of the next frame. In addition, the information $h'_t$ on the hidden state of the current frame in the second RNN may be additionally recurrent to the hidden layer of the next frame of the first RNN. This structure may be called interconnected RNNs.

The information $h_t$ on the hidden state of the current frame of the first RNN 51 is as shown in Mathematical Formula (3), and the output $y_t$ of the first RNN 51 is as shown in Mathematical Formula (2). In addition, the information $h'_t$ on the hidden state of the current frame of the second RNN 51 and the output $y'_t$ of the second RNN 51 are as shown in Mathematical Formulas (4) and (5), respectively.

Ultimately, the first RNN 51 may acquire information on a previous frame via a connecting wire recurrent from the second RNN 52. The information on a previous frame may be information not only in a layer to which the first RNN 51 belongs but also information in other pre-processed layers, thereby a discontinuously artifact output is further reduced. It is expected that this RNN series connection structure may be effectively used in image recognition and image classification.

An RNN may be implemented as a long short-term memory (LSTM), which is a network structure for resolving a vanishing gradient.

Figure 6:
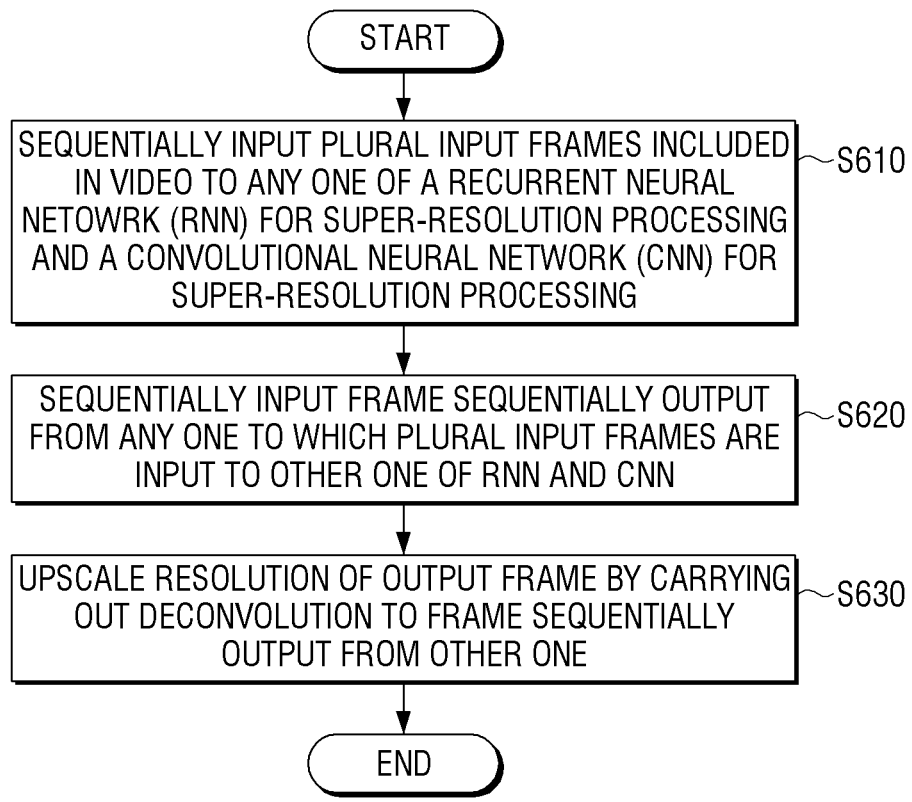
FIG. 6 is a flowchart illustrating a super-resolution processing method of a moving image, according to an embodiment.

FIG. 6 is a flowchart illustrating a method of super-resolution processing of a moving image, according to an embodiment.

First, a plurality of input frames included in a moving image are sequentially input to any one of an RNN and a CNN, at step S610. The frames sequentially output from any one of the RNN and the CNN to which the plurality of input frames are input are sequentially input to an other one of the RNN and the CNN, at step S620. In other words, the plurality of frames included in the moving image are sequentially input to the RNN or the CNN and a plurality of frames sequentially output from the RNN or the CNN are sequentially input to the CNN or the RNN, respectively.

In this regard, deconvolution may be carried out with respect to the frames sequentially output from the other RNN and the other CNN and a resolution of the output frames may be upscaled, at step S630. In other words, the deconvolution may be performed with respect to the plurality of frames sequentially output from the CNN or the RNN and the resolution of the plurality of frames may be upscaled.

A super-resolution processing method in an order of first sequentially inputting a plurality of input frames included in a moving image to an RNN and sequentially inputting frames output from the RNN to a CNN will be described. The frames sequentially output from the CNN may be recurrent to the RNN and in this case, the frames sequentially output from the CNN may include information on a frame of a higher resolution than a corresponding frame input to the RNN.

In this regard, the CNN may include a residual network (ResNet) that may be a network having a structure in which frames sequentially input from the RNN are filtered to generate a feature map. The ResNet may be serially connected and include a residual block (resblock) which applies batch normalization to the feature map and applies an activation function to the normalized feature map.

In addition, the frames sequentially output from the CNN may be sequentially input to an additional RNN, and the information on the hidden state of the additional RNN may be recurrent to the RNN (i.e., the initial RNN, and not the other RNN).

A moving image may include a number of scene changes. Further, the information on a previous frame when a scene change is carried out does not have continuity with a current frame and thus, it is not necessary to reflect the information on the previous frame in the current frame in the RNN. If the information on the previous frame is reflected in the current frame in the RNN, the quality of super-resolution processing may actually deteriorate.

Accordingly, in the at least one RNN described above, a scene change of a moving image may be anticipated based on information on the hidden state of the recurrent previous frame, and when the scene change is anticipated, the information on the hidden state of the previous frame may be changed to a zero value. Based on the information on the hidden state of the previous frame which is changed to the zero value, the information on the hidden state of the current frame may be updated.

Accordingly, a zero value may be reflected in the information on the hidden state of the current frame and thus, the information on the hidden state of the previous frame does not substantially affect the information on the hidden state of the current frame.

In this regard, a process of anticipating a scene change among a plurality of frames included in a moving image may include anticipating information $h_{t|t-1}$ on the hidden state of the current frame based on the information $h_{t-1}$ on the hidden state of the previous frame, calculating an error rate by using the anticipated $h_{t|t-1}$, and anticipating a scene change of a moving image based on whether the calculated error rate exceeds a predetermined threshold value.

The anticipated $h_{t|t-1}$ may be expressed as Formula (8) as shown below.

$$h_{t|t-1} = \sigma_h(\hat{W}_h * x_{t-1} + \hat{U}_h * h_{t-1} + \hat{V}_h * h'_{t-1} + \hat{b}_h)$$ [Mathematical Formula (8)]

In Mathematical Formula (8), each of $\hat{W}_h$, $\hat{U}_h$, $\hat{V}_h$ and $\hat{b}_n$ refers to an additional weight value which is predetermined to anticipate the information $h_t$ on the hidden state of the current frame.

Meanwhile, the information $h_t$ on the hidden state of the current frame may be defined in accordance with Mathematical Formula (9), shown below.

The decision on whether a scene change is carried out or not may be made according to the Mathematical Formula (9), as shown below.

[Mathematical Formula (9)]

If $\dfrac{\sqrt{\sum |h_t - h_{t|t-1}|}}{m} >$ threshold, then set $h_{t-1}$ and $h'_{t-1}$ to 0 and re-compute $h_t$ Thus, a method of anticipating a scene change may include, when a value calculated based on a difference between $h_t$ and $h_{t|t-1}$ and a frame size (m) is greater than a predetermined threshold, determining that a scene change has been made between t and t−1, changing $h_{t-1}$ and $h'_{t-1}$ to a zero value, and updating $h_t$ based on the $h_{t-1}$ value, which is changed to a zero value, and the $h'_{t-1}$ value, which is changed to a zero value.

Figure 7:
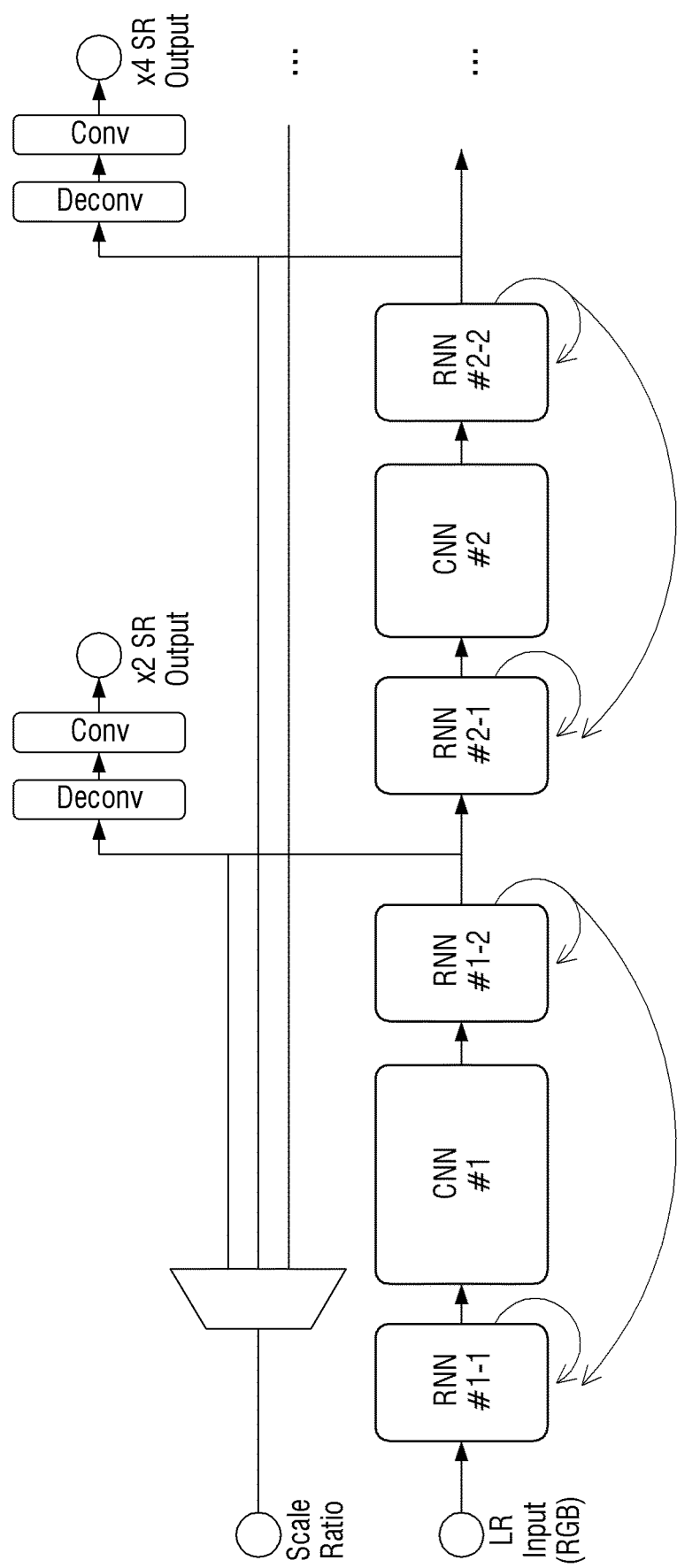
FIG. 7 is a diagram illustrating a method of modularizing an execution processing of the CNN and the RNN and adjusting a super-resolution ratio, according to an embodiment.

As illustrated in FIG. 7, a calculation process of the CNN and the RNN may be modularized to adjust a super-resolution ratio. In other words, modules, including a neural network in which the CNN and the RNN are combined with each other, may be serially connected and an output terminal of each module may be connected with a module which performs a deconvolutional calculation and a convolutional calculation, and a moving image may be scaled up to 2× or 4×.

An operation of each module is as described with reference to FIGS. 2 to 5. In this regard, a predetermined scale-up ratio may be input to an output terminal of each module, and a moving image may be scaled up by integer multiples according to the predetermined scale-up ratio.

Figure 8:
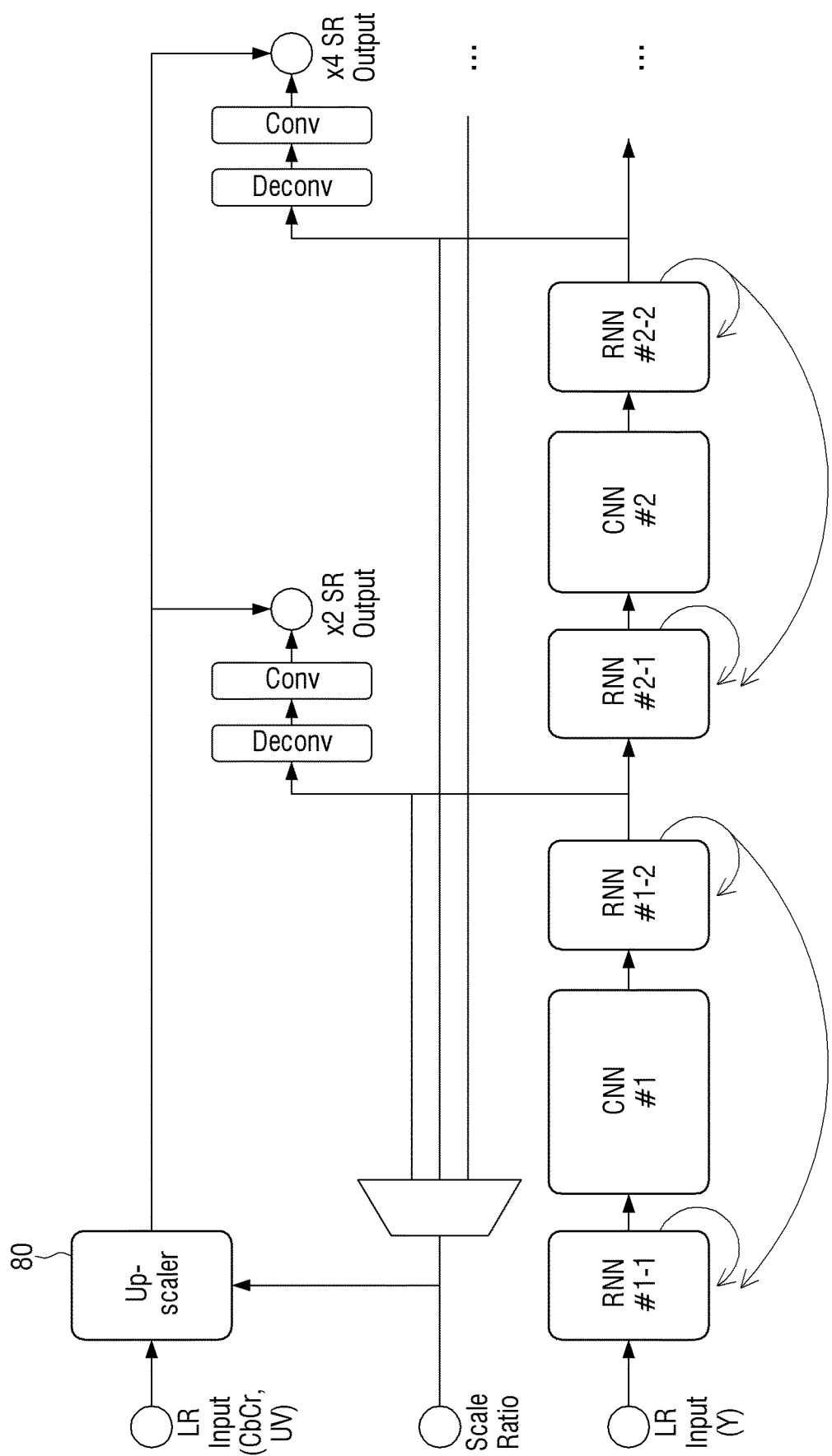
FIG. 8 is a diagram illustrating a method of separating a channel according to an output format of a moving image and performing a super-resolution processing process, according to an embodiment.

FIG. 8 is a diagram illustrating a method of separating a channel according to an output format of a moving image and performing a super-resolution processing process, according to an embodiment.

A moving image which is input for super-resolution processing may have an output format of any one of an RGB channel, a YCbCr channel, or a luminance blue-luminance red-luminance (YUV) channel). The YCbCr channel is a form in which a luma sample and a chroma sample are distinguished from each other and stored for each pixel, wherein Y corresponds to a luma sample and Cb and Cr correspond to a chroma sample. The YCbCr channel is a scheme which reduces spatial data overlappingly present among each of R, G and B in the RGB channel scheme to thereby increase an efficiency of transmission and storage.

A human eye is relatively insensitive in recognizing color of a colored image compared to recognizing a brightness or darkness of the image. Thus, in a case of a moving image, a large number of bits (corresponding to resolution) are allocated to a Y component, and a small number of bits are allocated to Cb and Cr components.

Accordingly, in a case of carrying out super-resolution processing for a moving image having an output format of a YCbCr channel, as illustrated in FIG. 8, only the Y component is input to a neural network structure in which the RNN and the CNN are combined with each other, and the Cb and Cr components go through an additional processing like the previous method and are upscaled. Thus, an amount of calculation (i.e., processing) is reduced and a calculation speed is increased. Accordingly, a calculation efficiency is significantly increased.

The Cb and Cr components are upscaled by going through additional processing in an upscaler 80, and the upscaled Cb component and the upscaled Cr component are combined with the upscaled Y component and finally, a moving image of which all color components are upscaled may be obtained.

Figure 9:
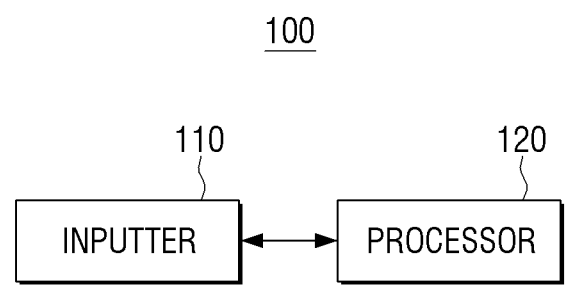
FIG. 9 is a block diagram illustrating a configuration of an image processing apparatus, according to an embodiment.

FIG. 9 is a block diagram illustrating a configuration of an image processing apparatus, according to an embodiment.

Referring to FIG. 9, an image processing apparatus 100 includes an image inputter 110 and a processor 120.

The image inputter 110 receives an input of an image. An image may include a still image and a moving image.

The processor 120 is a component for controlling an overall operation of the image processing apparatus 100. The processor 120 may perform the super-resolution processing method, as described above, and may be implemented as an embedded processor such as a micro controller unit (MCU).

The processor 120 may sequentially input a plurality of input frames included in a moving image to any one of the RNN for super-resolution processing and the CNN for super-resolution processing, and sequentially input frames sequentially output from the any one of the RNN and the CNN to an other one of the RNN and the CNN (i.e., if output from RNN then sequentially input to CNN, or if output from CNN then sequentially input to RNN). In other words, the processor 120 may sequentially input a plurality of frames included in a moving image to the RNN for super-resolution processing or the CNN for super-resolution processing, and in response to a plurality of frames being sequentially output from the RNN or the CNN, sequentially input the plurality of frames to the CNN or the RNN, respectively.

In this regard, the processor 120 may carry out deconvolution of frames sequentially output from the other one of the RNN and the CNN and upscale a resolution of the output frames. In other words, the processor 120 may perform deconvolution for the plurality of frames sequentially output from the CNN or the RNN and upscale a resolution of the plurality of frames.

An embodiment in which the processor 120 sequentially inputs a plurality of input frames to the RNN and the frames output from the RNN are sequentially input to the CNN will be described.

The processor 120 may recurrent frames sequentially output from the CNN to the RNN, and the frames output from the CNN may include information on a frame of higher resolution than a corresponding frame input to the RNN.

In addition, the processor 120 may input frames sequentially output from the CNN to an additional RNN, and recurrent information on a hidden status of the additional RNN to an initial RNN. In this regard, the processor 120 may carry out deconvolution for frames sequentially output from the other RNN.

In addition, the processor 120 may filter frames sequentially input from the RNN through the CNN and generate a feature map, carry out batch normalization for the feature map, apply an activation function to the normalized feature map, and carry out super-resolution processing.

In addition, the processor 120 may anticipate a scene change of a moving image by using information on a hidden status of a previous frame recurrent from the RNN. When a scene change is anticipated, the processor 120 may change the information on the hidden status of the previous frame to a zero value, and update the information on the hidden status of the current frame based on the information on the hidden status of the previous frame which is changed to a zero value.

In addition, the processor 120 may calculate an error rate by using information on the hidden status of the current frame anticipated based on the hidden status of the previous frame, and anticipate a scene change of a moving image according to whether the calculated error rate exceeds a predetermined threshold.

When an output format of a moving image is a YCbCr channel or a YUV channel, the processor 120 may sequentially input only frames corresponding to a Y channel from among a plurality of input frames to one of the RNN and the CNN.

However, an operation of upscaling a resolution of an output frame by carrying out deconvolution may be carried out in the upscaler 80 of FIG. 8, which is a processing device apart from the processor 120, according to an embodiment.

According to the embodiment described above, combining an RNN module with a CNN module requires a relatively small calculation amount compared with combining a CNN module with a CNN module. Thus, combining an RNN module with a CNN module can efficiently process consecutive frames with a small amount of calculation (i.e. processing).

Figure 10:
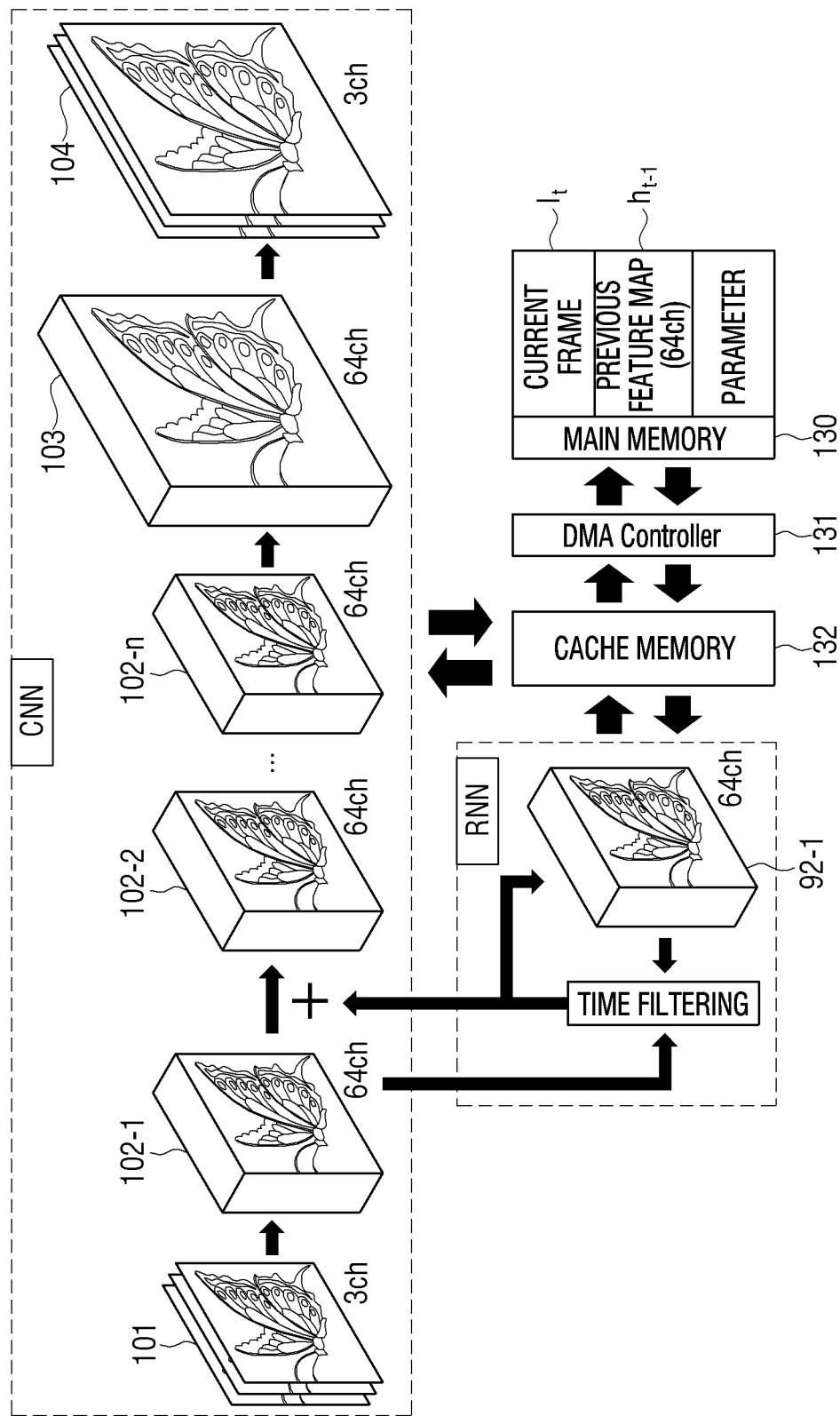
FIG. 10 is a diagram illustrating a bottleneck phenomenon of a memory bandwidth, according to an embodiment.

FIG. 10 is a diagram illustrating a method of loading a feature map of a previous frame and reflecting the loaded feature map in a feature map of a current frame.

As illustrated in FIG. 10, a frame $I_t$ at present t input to the CNN and $h_{t-1}$ relating to a feature map 92-1 of the previous frame at the time of t−1 are stored in a storage 130 of an image processing apparatus 100. In this regard, $h_{t-1}$ for the feature map 92-1 of the previous frame includes information on the feature map 92-1 of the previous frame.

Along with the above, a convolution weight applied to for the feature map 92-1 of the previous frame may be stored in the storage 130 as a parameter. The $h_{t-1}$ for the feature map of the previous frame stored in the storage 130 may respectively include $h_{t-1}$ corresponding to each of the first to nth feature maps 102-1 to 102-n of the previous frame.

The storage 130 may be controlled by the direct memory access (DMA) controller 131 without intervention of the processor 120. The DMA controller 131 may directly read a current frame $I_t$, $h_{t-1}$ for the first feature map 92-1 of the previous frame, and a parameter from the storage 130. The DMA controller 131 may temporarily store the read current frame $I_t$, the read $h_{t-1}$ for the first feature map 92-1 of the previous frame, and the read parameter in a cache memory 132. However, an operation of the DMA controller 131 may be carried out in the processor 120 as well.

In this regard, the processor 120 may carry out time filtering to reflect $h_{t-1}$ for the first feature map 92-1 of the previous frame stored in the cache memory 132 in $h_t$ for the first feature map 102-1 of the current frame, and output $h_t'$ for which $h_t$ for the first feature map 102-1 of the current frame is updated. In this regard, $h_t'$ may be an output value of a particular function having the factors of $h_t$ and $h_{t-1}$.

The updated $h_t'$ is added to $h_t$ for the first feature map 102-1 of the current frame and becomes $h_t'$ representing a second feature map 102-2 of the current frame. This time filtering process may be carried out in the same manner for $h_{t-1}$ for the second to nth feature maps 102-1 to 102-n of the previous frame as well.

The processor 120 may carry out deconvolution of the final feature map 102-N output in this way to generate a super-resolution feature map 103, and carry out convolution again of the super-resolution feature map 103 to ultimately obtain a super-resolution frame 104 of three channels.

Accordingly, a motion of cumulated previous frames may be internally compensated, and thereby, a super-resolution moving image capable of expressing smooth motion may be generated.

However, as described above, in the case in which $h_{t-1}$ for the feature map 92-1 of the previous frame is stored in the storage 130, a storage space of large capacity is required and $h_{t-1}$ of many channels (64 ch) is loaded and thus, a large bandwidth may be generated undesirably.

Figure 11:
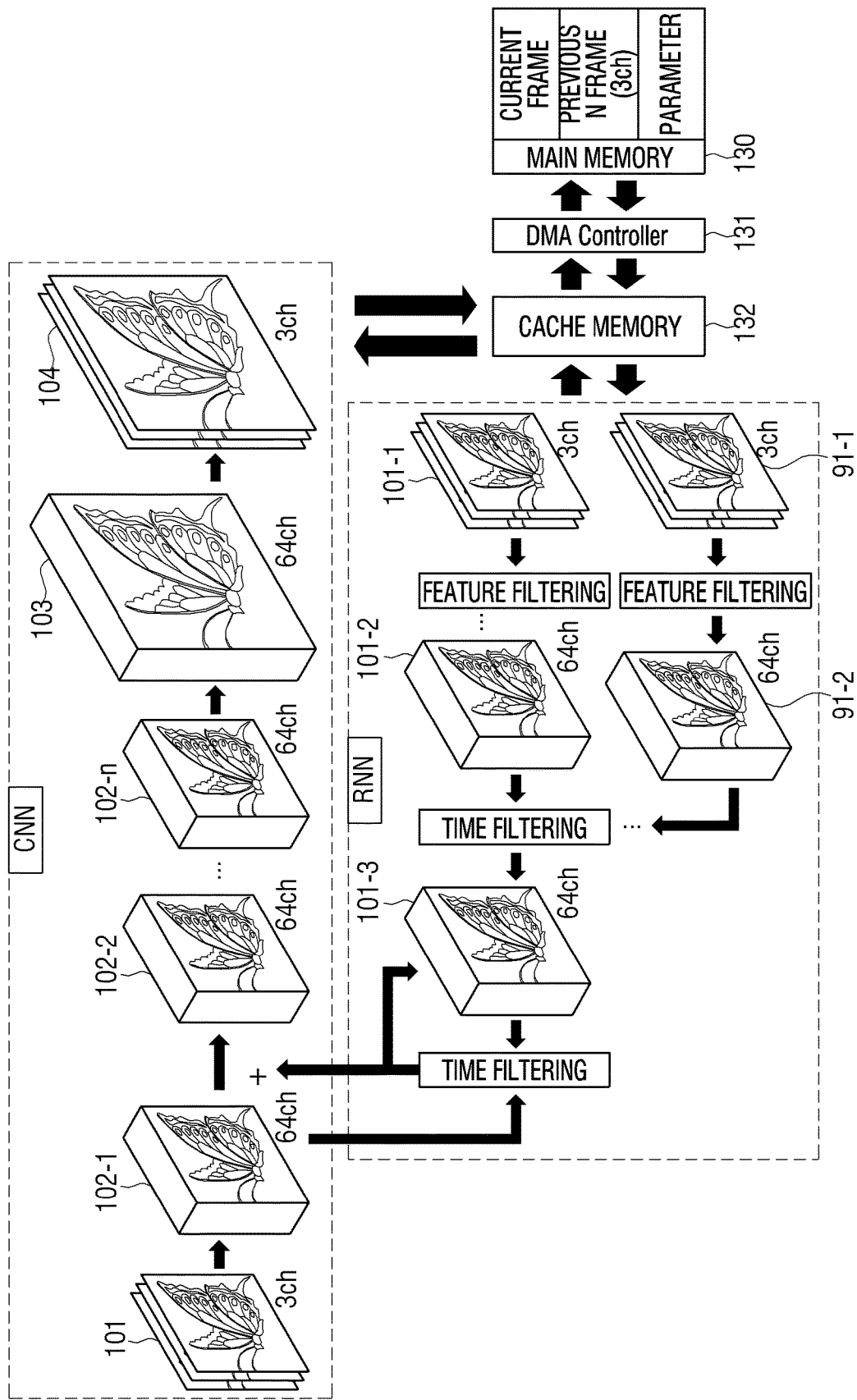
FIG. 11 is a diagram illustrating a method for resolving a bottleneck phenomenon of a memory bandwidth, according to an embodiment.

FIG. 11 is a diagram illustrating an embodiment for resolving storage space and bandwidth issues occurring, according to the embodiment of FIG. 10.

As illustrated in FIG. 11, an input frame $I_{t-1}$ at 91-1, not $h_{t-1}$ for the feature map of the previous frame, is stored in the storage 130. In other words, an $h_{t-1}$ for 64 channels is not stored, rather the input frame $I_{t-1}$ at 91-1 of three channels is stored and thus, a storage space can be efficiently used.

Meanwhile, the DMA controller 131 reads the previous input frame $I_{t-1}$ at 91-1 stored in the storage 130 and then, temporarily stores it in the cache memory 132. The processor 120 carries out filtering (hereinafter referred to as "feature filtering") for generating a feature map for the input frame $I_{t-1}$ at 91-1 of three channels stored in the cache memory 132, similar to the CNN, and generates a feature map 91-2 of 64 channels. The generated feature map 91-2 of 64 channels is subject to time filtering as illustrated in FIG. 10.

FIG. 11 illustrates an example of carrying out feature filtering for the input frame $I_{t-2}$ at 101-1 at the time of t−2 and additionally generating a feature map 101-2 of channels at the time of t−2.

In this regard, the processor 120 may reflect $h_{t-1}$ for the feature map 101-2 at the time of t−1 in $h_{t-2}$ for the feature map 91-2 at the time of t−2, and output $h_{t-2}'$ for which the $h_{t-2}$ for the feature map 91-2 at the time of t−2 is updated. Thus, $h_{t-2}'$ may be an output value of a particular function having the factors of $h_{t-2}$ and $h_{t-1}$.

The processor 120 may reflect the updated $h_{t-2}'$ in $h_t$ of the current frame and output $h_t'$ for which $h_t$ of the current frame is updated. In this regard, $h_t'$ may be an output value of a particular function having the factors of $h_t$ and $h_{t-2}'$.

The updated $h_t'$ is added to $h_t$ of the current frame and becomes a second feature map 102-2 of the current frame. In other words, as illustrated in FIG. 10, $h_{t-1}$ of the previous frame may be generated by storing the input frame $I_{t-1}$ in the storage 130 and carrying out feature filtering and time filtering for the stored input frame $I_{t-1}$. Accordingly, all may be stored while compensating for a motion of the previous frames, and problems related to storage space and bandwidth according to loading the stored $h_{t-1}$ may be resolved.

A method of super-resolution processing of a moving image may be embodied as a program and then stored on various types of recording media. For example, a computer program that has been processed by various processors and therefore has become capable of executing the aforementioned control methods may be stored in a non-transitory recording medium and be used.

As an example, a non-transitory computer readable medium may store a program to perform the steps of inputting a plurality of input frames included in a moving image to a recurrent neural network (RNN) for super-resolution processing, inputting a plurality of output frames of the RNN to a convolutional neural network for super-resolution processing, and upscaling a resolution of a plurality of output frames by deconvoluting a plurality of output frames of the CNN.

The non-transitory computer readable medium refers to a medium that stores data semi-permanently rather than a medium storing data for a very short time, such as a register, a cache, or a memory, and is readable by an apparatus.

The above-described applications or programs may be stored in the non-transitory computer readable medium, (i.e., a compact disc (CD), a digital versatile disc (DVD), a hard disc, a Blu-ray disc, a universal serial bus (USB), a memory card, and a read only memory (ROM)).

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. A super-resolution processing method of a video, the method comprising:
   sequentially inputting a plurality of frames included in the video to a recurrent neural network (RNN) for super-resolution processing or a convolutional neural network (CNN) for super-resolution processing;
   in response to a plurality of frames being sequentially output from the RNN, sequentially inputting the plurality of frames to the CNN, respectively;
   in response to a plurality of frames being sequentially output from the CNN, sequentially inputting the plurality of frames to the RNN, respectively; and
   upscaling a resolution of a plurality of frames output from the CNN or the RNN by performing deconvolution with respect to the plurality of frames output from the CNN or the RNN.

2. The super-resolution processing method as claimed in claim 1, wherein sequentially inputting the plurality of frames included in the video to the RNN or the CNN further comprises sequentially inputting the plurality of frames to the RNN, and
   wherein sequentially inputting the plurality of frames sequentially output from the RNN or the CNN to the CNN or the RNN further comprises sequentially inputting a plurality of frames output from the RNN to the CNN.

3. The super-resolution processing method as claimed in claim 2, further comprising:
   recurring a plurality of frames sequentially output from the CNN to the RNN,
   wherein a plurality of frames output from the CNN include information relating to a frame of higher resolution than a corresponding frame input to the RNN.

4. The super-resolution processing method as claimed in claim 2, further comprising:
   sequentially inputting a plurality of frames sequentially output from the CNN to an additional RNN; and
   recurring information relating to a hidden status of the additional RNN to the RNN,
   wherein the upscaling comprises performing deconvolution for a plurality of frames sequentially output from the additional RNN.

5. The super-resolution processing method as claimed in claim 2, wherein the CNN generates a feature map by filtering out a plurality of frames sequentially output from the RNN, performing batch normalization with respect to the feature map, and applying an activation function to the normalized feature map.

6. The super-resolution processing method as claimed in claim 1, further comprising:
predicting a scene change of the video by using information on a hidden status of a previous frame recurrent from the RNN;
based on the scene change being predicted, changing information on the hidden status of the previous frame to a zero value; and
updating information on a hidden status of a current frame based on the information on the hidden state of the previous frame changed to the zero value.

7. The super-resolution processing method as claimed in claim 6, wherein predicting the scene change further comprises calculating an error rate by using the information on a hidden status of a current frame predicted based on the information on the hidden status of the previous frame, and
predicting a scene change of the video according to whether the calculated error rate exceeds a predetermined threshold.

8. The super-resolution processing method as claimed in claim 1, wherein sequentially inputting the plurality of frames included in the video to the RNN or the CNN further comprises, based on an output format of the video being a YCbCr channel, sequentially inputting only frames corresponding to a Y channel from among the plurality of frames to the RNN or the CNN.

9. The super-resolution processing method as claimed in claim 1, wherein the RNN includes a long short-term memory (LSTM) network.

10. An image processing apparatus which carries out super-resolution processing of a video, comprising:
an inputter configured to receive input of the video; and
a processor configured to:
sequentially input a plurality of frames included in the video to a recurrent neural network (RNN) for super-resolution processing and a convolutional neural network (CNN) for super-resolution processing,
in response to a plurality of frames being sequentially output from the RNN, sequentially input the plurality of frames to the CNN, respectively,
in response to a plurality of frames being sequentially output from the CNN, sequentially inputting the plurality of frames to the RNN, respectively; and
upscale a resolution of a plurality of frames output from the CNN or the RNN by performing deconvolution for the plurality of frames sequentially output from the CNN or the RNN.

11. The image processing apparatus as claimed in claim 10, wherein the processor is further configured to:
sequentially input the plurality of frames to the RNN, and sequentially input the plurality of frames output from the RNN to the CNN.

12. The image processing apparatus as claimed in claim 11, wherein the processor is further configured to recur a plurality of frames sequentially output from the CNN to the RNN, and
wherein a plurality of frames output from the CNN include information on a frame of higher resolution than a corresponding frame input to the RNN.

13. The image processing apparatus as claimed in claim 11, wherein the processor is further configured to:
sequentially input a plurality of frames sequentially output from the CNN to an additional RNN,
recur information on a hidden status of the additional RNN to the RNN, and
carry out deconvolution for a plurality of frames sequentially output from the additional RNN.

14. The image processing apparatus as claimed in claim 11, wherein the CNN generates a feature map by filtering out a frame sequentially input from the RNN, carries out batch normalization for the feature map, and applies an activation function to the normalized feature map.

15. The image processing apparatus as claimed in claim 11, wherein the processor is further configured to:
predict a scene change of the video by using information on a hidden status of a previous frame recurrent from the RNN,
based on the scene change being predicted, change the information on the hidden status of the previous frame to a zero value, and
update information on a hidden status of a current frame based on the information on the hidden status of the previous frame changed to a zero value.

16. The image processing apparatus as claimed in claim 15, wherein the processor is further configured to:
calculate an error rate by using the information on a hidden state of a current frame predicted based on the information on the hidden status of the previous frame, and
predict a scene change of the video according to whether the calculated error rate exceeds a predetermined threshold.

17. The image processing apparatus as claimed in claim 10, wherein the processor is further configured to, based on an output format of the video being a YCbCr channel, sequentially input only frames corresponding to a Y channel from among the plurality of frames to the RNN or the CNN.

18. The image processing apparatus as claimed in claim 10, wherein the RNN includes a long short-term memory (LSTM) network.

19. A non-transitory recording medium that stores a program for executing a super-resolution processing method of a video, wherein the super-resolution processing method comprises:
sequentially inputting a plurality of frames included in the video to a recurrent neural network (RNN) for super-resolution processing or a convolutional neural network (CNN) for super-resolution processing;
in response to a plurality of frames being sequentially output from the RNN, sequentially inputting the plurality of frames to the CNN, respectively; and
in response to a plurality of frames being sequentially output from the CNN, sequentially inputting the plurality of frames to the RNN, respectively; and
upscaling a resolution of a plurality of frames output from the CNN or the RNN by performing deconvolution for the plurality of frames sequentially output from the CNN or the RNN.

* * * * *